(12) United States Patent
Wang et al.

(10) Patent No.: US 10,825,187 B2
(45) Date of Patent: Nov. 3, 2020

(54) METHOD AND SYSTEM FOR OBJECT TRACKING

(71) Applicant: Beijing SenseTime Technology Development Co., Ltd, Haidian District (CN)

(72) Inventors: Xiaogang Wang, Shatin (CN); Jing Shao, Shatin (CN); Chen-Change Loy, Shatin (CN); Kai Kang, Shatin (CN)

(73) Assignee: Beijing SenseTime Technology Development Co., Ltd, Beijing (CN)

( * ) Notice: Subject to any disclaimer, the term of this patent is extended or adjusted under 35 U.S.C. 154(b) by 288 days.

(21) Appl. No.: 16/158,016

(22) Filed: Oct. 11, 2018

(65) Prior Publication Data

US 2019/0043205 A1 Feb. 7, 2019

Related U.S. Application Data

(63) Continuation of application No. PCT/CN2016/078982, filed on Apr. 11, 2016.

(51) Int. Cl.
*G06T 7/246* (2017.01)
*G06N 3/04* (2006.01)
(Continued)

(52) U.S. Cl.
CPC .......... *G06T 7/248* (2017.01); *G06K 9/00201* (2013.01); *G06K 9/4619* (2013.01);
(Continued)

(58) Field of Classification Search
None
See application file for complete search history.

(56) References Cited

U.S. PATENT DOCUMENTS 9,754,351 B2 * 9/2017 Paluri .................. G06K 9/4628
10,733,714 B2 * 8/2020 El-Khamy ........... G06K 9/6857
(Continued)

FOREIGN PATENT DOCUMENTS

CN 101827224 A 9/2010
WO 2017/177367 10/2017

OTHER PUBLICATIONS

Sun et al, Deep Affinity Network for Multiple Object Tracking, Journal of Latex Class Files, vol. 13, No. 9, Sep. 2017 (Year: 2017).*
(Continued)

*Primary Examiner* — Andrae S Allison
(74) *Attorney, Agent, or Firm* — Garvey, Smith & Nehrbass, Patent Attorneys, L.L.C.; Fabian M. Nehrbass; Seth M. Nehrbass

(57) ABSTRACT

The application relates to a method and system for tracking a target object in a video. The method includes: extracting, from the video, a 3-dimension (3D) feature block containing the target object; decomposing the extracted 3D feature block into a 2-dimension (2D) spatial feature map containing spatial information of the target object and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location.

20 Claims, 4 Drawing Sheets

(51) Int. Cl.
 G06N 3/063 (2006.01)
 G06K 9/62 (2006.01)
 G06K 9/00 (2006.01)
 G06K 9/46 (2006.01)
 G06K 9/32 (2006.01)
 G06N 20/10 (2019.01)

(52) U.S. Cl.
 CPC ......... *G06K 9/4628* (2013.01); *G06K 9/6215* (2013.01); *G06K 9/6232* (2013.01); *G06K 9/6271* (2013.01); *G06N 3/0454* (2013.01); *G06N 3/063* (2013.01); *G06K 2009/3291* (2013.01); *G06N 20/10* (2019.01); *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 2009/0296985 A1* | 12/2009 | Lv | ............. | G06T 7/285 382/103 |
| 2010/0034423 A1* | 2/2010 | Zhao | ............. | G06T 7/12 382/103 |
| 2010/0201871 A1 | 8/2010 | Zhang et al. | | |
| 2010/0214936 A1* | 8/2010 | Ito | ............. | G06N 3/04 370/252 |
| 2011/0116711 A1* | 5/2011 | Wang | ............. | G06K 9/4671 382/165 |
| 2011/0182469 A1* | 7/2011 | Ji | ............. | G06K 9/4628 382/103 |
| 2012/0299945 A1* | 11/2012 | Aarabi | ............. | G06T 11/60 345/589 |
| 2019/0042867 A1* | 2/2019 | Chen | ............. | G06N 5/022 |
| 2020/0158869 A1* | 5/2020 | Amirloo Abolfathi | ............. | G01S 17/89 |
| 2020/0211217 A1* | 7/2020 | Cairl | ............. | G05D 1/0214 |
| 2020/0257902 A1* | 8/2020 | Yao | ............. | G06K 9/00744 |

OTHER PUBLICATIONS

Han et al, A parallel spatiotemporal deep learning network for highway traffic flow forecasting, International Journal of Distributed Sensor Networks, 2019, vol. 15(2). (Year: 2019).*

Qiao et al, A Time-Distributed Spatiotemporal Feature Learning Method for Machine Health Monitoring with Multi-Sensor Time Series, Sensors 2018, 18, 2932; doi:10.3390/s18092932 (Year: 2018).*

Tran , Du et al . , "Learning Spatiotemporal Features with 3D Convolutional Networks ," Oct. 7, 2015 (Year: 2015).*

Human Tracking Using Convolutional Neural Networks, IEEE Transactions on Neural Networks, vol. 21, No. 10, Oct. 2010.

Real-Time Tracking of Moving Persons by Exploiting Spatio-Temporal Image Slices, IEEE Transactions on Pattern Analysis and Machine Intelligence, vol. 22, No. 8, Aug. 2000.

3D Convolutional Neural Networks for Human Action Recognition, Shuiwang Ji, Wei Xu, Ming Yang, and Kai Yu.

International Search Report, completed Dec. 20, 2016, PCT/CN2016/078982.

* cited by examiner

METHOD AND SYSTEM FOR OBJECT TRACKING

CROSS REFERENCE TO RELATED APPLICATION

This application is a continuation of PCT/CN2016/078982, filed on Apr. 11, 2016 and entitled "METHOD AND SYSTEM FOR OBJECT TRACKING", the entire disclosure of which is hereby incorporated by reference.

TECHNICAL FIELD

The application relates to a method and a system for tracking a target object in a video.

BACKGROUND

It is a crucial task to track a target object in a video. Generally, the target object (e.g., a group or an individual) should first be recognized from each frame of the video. Then a tracking is performed to capture movements of objects separately.

A lot of learning-based methods are developed for the object tracking. Convolutional Neural Network (CNN), as a successful deep learning model applied in the object tracking, has demonstrated superior performances in speed and accuracy. It is desired to develop a CNN to enhance the accuracy of the object tracking.

SUMMARY

The following presents a simplified summary of the application in order to provide a basic understanding of some aspects of the application. This summary is not an extensive overview of the application. This summary neither identifies key or critical elements of the application nor delineates any scope of particular embodiments of the application, or any scope of the claims. Its sole purpose is to present some concepts of the application in a simplified form as a prelude to the more detailed description that is presented later.

In order to address, at least partially, one of the above issues, a method and a system for tracking a target object in a video is provided. The method includes: extracting, from the video, a 3-dimension (3D) feature block containing the target object; decomposing the extracted 3D feature block into a 2-dimension (2D) spatial feature map containing spatial information of the target object and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location. According to the application, the location of the target object and the dynamic features (e.g., speed and acceleration) of the target object are detected in a single task. Therefore, accuracy of the object tracking is improved.

In at least one embodiment of the present application, the 2D spatial feature map may extend in a first spatial direction and a second spatial direction intersecting with the first spatial direction. Accordingly, the location of the target object may be estimated in the 2D spatial feature map.

In at least one embodiment of the present application, the 2D spatial-temporal feature map may include: a first 2D spatial-temporal feature map extending in the first spatial direction and a temporal direction and including components of the speed and the acceleration of the target object in the first spatial direction; and a second 2D spatial-temporal feature map extending in the second spatial direction and the temporal direction and including components of the speed and the acceleration of the target object in the second spatial direction. According to the presented solution, the first and second 2D spatial-temporal feature maps provide spatial-temporal information of the target object in separate directions. Therefore, the location of the target object may be calibrated more precisely.

In at least one embodiment of the present application, the method may include providing a CNN including a feature extracting layer, wherein the extracting may include: filtering, in the feature extracting layer, each frame of the video to obtain first feature maps; evaluating overlap degrees and similarity degrees between the first feature maps and a preset image containing a feature of interest (FOI) of the target object; and selecting, from the first feature maps, a second feature map according to the overlap degrees and the similarity degrees, wherein the second feature map only contains the FOI of the target object; and combining the selected second feature map over each frame of the video together to construct the 3D feature block. In an alternative implementation, the evaluating includes comparing the first feature maps with a binary mask generated from the preset image.

In at least one embodiment of the present application, the CNN may further include a swap layer coupled to the feature extracting layer, and wherein the decomposing may include: receiving the 3D feature block from the feature extracting layer; disabling data of the received feature block in the temporal direction to obtain the 2D spatial feature map; and disabling data of the received feature block in one of the first spatial direction and the second spatial direction to obtain the 2D spatial-temporal feature map.

In at least one embodiment of the present application, the CNN may further include a 2D spatial feature extracting layer coupled to the swap layer, and wherein the estimating may include: receiving the 2D spatial feature map from the swap layer; enhancing discrepancies of the FOI in the 2D spatial feature map; recognizing the target object according to the enhanced FOI; and estimating the location of the recognized target object.

In at least one embodiment of the present application, the CNN may further include a 2D spatial-temporal feature extracting layer coupled to the swap layer and parallel to the 2D spatial feature extracting layer, and wherein the determining may include: receiving the 2D spatial-temporal feature map from the swap layer; enhancing discrepancies of the FOI in the 2D spatial-temporal feature map; recognizing the target object according to the enhanced FOI; and performing a derivation operation on the recognized target object in the temporal direction, to determine the speed and the acceleration of the target object.

In at least one embodiment of the present application, the method may include: training the feature extracting layer independently; and training, based on the trained feature extracting layer, the 2D spatial feature extracting layer and the 2D spatial-temporal feature extracting layer separately.

In another aspect, a system for tracking a target object in a video is provided. The system may include: a memory that stores executable components; and a processor electrically coupled to the memory to execute the executable components. The executable components is configured for: extracting, from the video, a 3D feature block containing the target object; decomposing the extracted 3D feature block into: a 2D spatial feature map containing spatial information of the target object; and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location.

In yet another aspect, a system for tracking a target object in a video is provided. The system may include: a feature extractor configured for extracting, from the video, a 3D feature block containing the target object; a decomposer configured for decomposing the extracted 3D feature block into a 2D spatial feature map containing spatial information of the target object and a 2D spatial-temporal feature map containing spatial-temporal information of the target object; a locator configured for estimating, in the 2D spatial feature map, a location of the target object; a motion detector configured for determining, in the 2D spatial-temporal feature map, a speed and an acceleration of the target object; a calibrator configured for calibrating the estimated location of the target object according to the determined speed and acceleration; and a tracker configured for tracking the target object in the video according to the calibrated location.

In yet another aspect, a non-transitory computer readable storage medium is provided. The storage medium stores computer readable instructions executable by a processor to perform operations including: extracting, from the video, a 3D feature block containing the target object; decomposing the extracted 3D feature block into a 2D spatial feature map containing spatial information of the target object and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location.

BRIEF DESCRIPTION OF THE DRAWING

Exemplary non-limiting embodiments of the present application are described below with reference to the attached drawings. The drawings are illustrative and generally not to an exact scale. The same or similar elements on different figures are referenced with the same reference numbers.

DETAILED DESCRIPTION

Reference will now be made in detail to some specific embodiments of the present application contemplated by the inventors for carrying out the present application. Examples of these specific embodiments are illustrated in the accompanying drawings. While the present application is described in conjunction with these specific embodiments, it will be appreciated by one skilled in the art that it is not intended to limit the present application to the described embodiments. In the following description, numerous specific details are set forth in order to provide a thorough understanding of the present application. The present application may be practiced without some or all of these specific details. In other instances, well-known process operations have not been described in detail in order not to unnecessarily obscure the present application.

The terminology used herein is for the purpose of describing particular embodiments only and is not intended to be limiting of the present application. As used herein, the singular forms "a", "an" and "the" are intended to include the plural forms as well, unless the context clearly indicates otherwise. It will be further understood that the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

Figure 1:
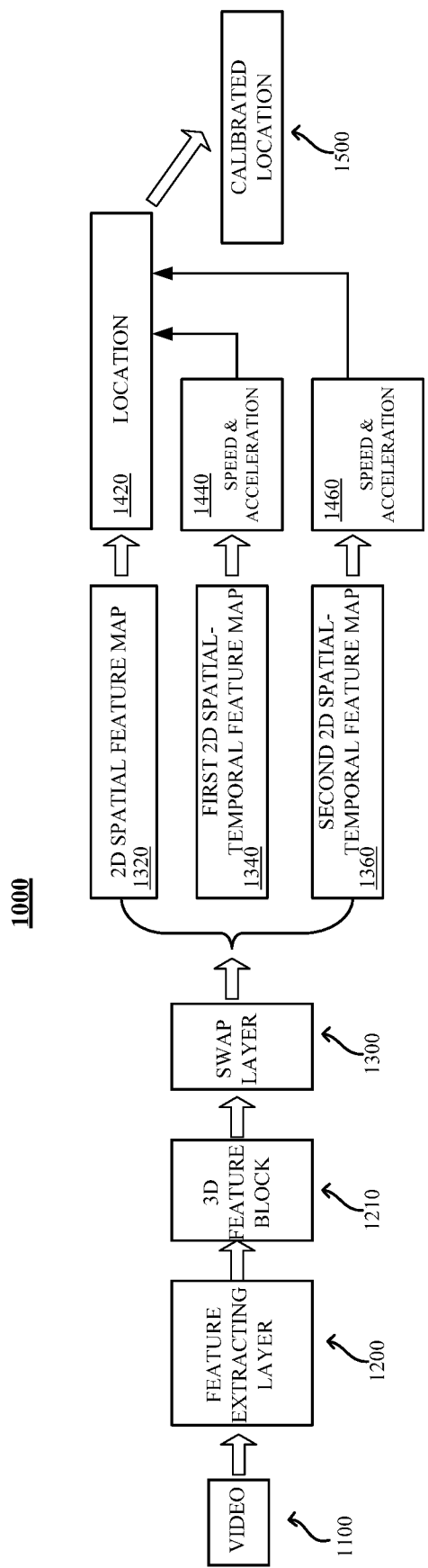
FIG. 1 is a schematic diagram illustrating an exemplary system for tracking a target object in a video according to at least one embodiment of the present application.

An exemplary system 1000 for tracking the object is illustrated in FIG. 1. Hereinafter, the systems and the processes for object tracking will be described under frameworks of CNNs for the purpose of illustration. A video 1100 containing a target object is input to a feature extracting layer 1200. The feature extracting layer 1200 may be implemented in various CNN models, such as AlexNet, Clarifai, Overfeat, GoogleNet, and Visual Geometry Group (VGG). As would be appreciated by one skilled in the art, the feature extracting layer 1200 may be embodied in a plurality of layers. Accordingly, features in lower layers capture low-level information, while those in higher layers can represent more abstract concepts. A plurality of filtering operations may be applied to the video 1100 to extract 3D feature blocks 1210. The 3D feature blocks 1210 may extend in, for example but not limited to, a horizontal direction (denoted as X), a vertical direction (denoted as Y), and a temporal direction (denoted as T).

It is admitted that it will cost a lot to process the 3D feature blocks in a single convoluting operation. As a consequence, the 3D feature blocks 1210 may be decomposed into one or more (for example, three) 2D slices in a swap layer 1300. XY-slices (i.e., 2D spatial feature map 1320) of the 3D feature blocks 1210 may represent feature maps as traditionally extracted from frames of the video 1100 via the filtering operations stated above. Therefore, XY-slices of the 3D feature blocks 1210 contain spatial information of the target object. Accordingly, XT-slices (i.e., first 2D spatial-temporal feature maps 1340) and YT-slices (i.e., second 2D spatial-temporal feature maps 1360) contain spatial-temporal information of the target object since they both extend in a spatial direction and a temporal direction. The decomposing operation may be implemented by enabling data in two of the three directions and disabling data in the remaining direction.

As has been discussed above, the 2D spatial feature maps 1320 can be regarded as feature maps extracted from a frame of the video 1100. The 2D spatial feature maps 1320 may include various types of semantic meaningful representations of various objects and backgrounds. In an alternative implementation, the 2D spatial feature maps 1320 may be further filtered to enhance representation capacities (discrepancies) thereof with the enhanced discrepancies, the target object contained in each frame of the video can be recognized from other objects and backgrounds. Accordingly, a first set of locations 1420 can be estimated based on the recognized object.

The 2D spatial-temporal feature maps 1340 and 1360 represent profiles of the video along a spatial direction. The 2D spatial-temporal feature maps 1340 and 1360 may also include various types of semantic meaningful representations of various objects and backgrounds. In an alternative implementation, the 2D spatial-temporal feature maps 1340 and 1360 may also be further filtered to enhance representation capacities (discrepancies) thereof. With the enhanced discrepancies, the target object contained in each frame of the video can be recognized from other objects and backgrounds. Although 2D spatial-temporal feature maps 1340 and 1360 have less spatial representations as those of the 2D spatial feature maps 1320, the 2D spatial-temporal feature maps 1340 and 1360 have additional information related to time. Therefore, dynamic information (e.g., speed and acceleration 1440 and 1460), can be derived from the 2D spatial-temporal feature maps 1340 and 1360 by, for example but not limited to, a derivation operation.

It is crucial to obtain the dynamic information of recognized targets in the field of object tracking. For example, the dynamic information may be utilized to predict the motion of the target object in subsequent frames of the video. In applications, the speed and the acceleration in the X direction (denoted as $V_X$ and $A_X$, respectively) may be derived from the XT-slices (i.e., first 2D spatial-temporal feature maps 1340), and the speed and the acceleration in the Y direction (denoted as $V_Y$ and $A_Y$, respectively) may be derived from the YT-slices (i.e., first 2D spatial-temporal feature maps 1340). At least one of the dynamic information of $V_X$, $A_X$, $V_Y$, and $A_Y$ may be utilized to calibrate the first set of locations 1420 estimated previously in the 2D spatial feature maps. With the calibrated locations 1500, it is possible to track the object in a higher accuracy.

Figure 2:
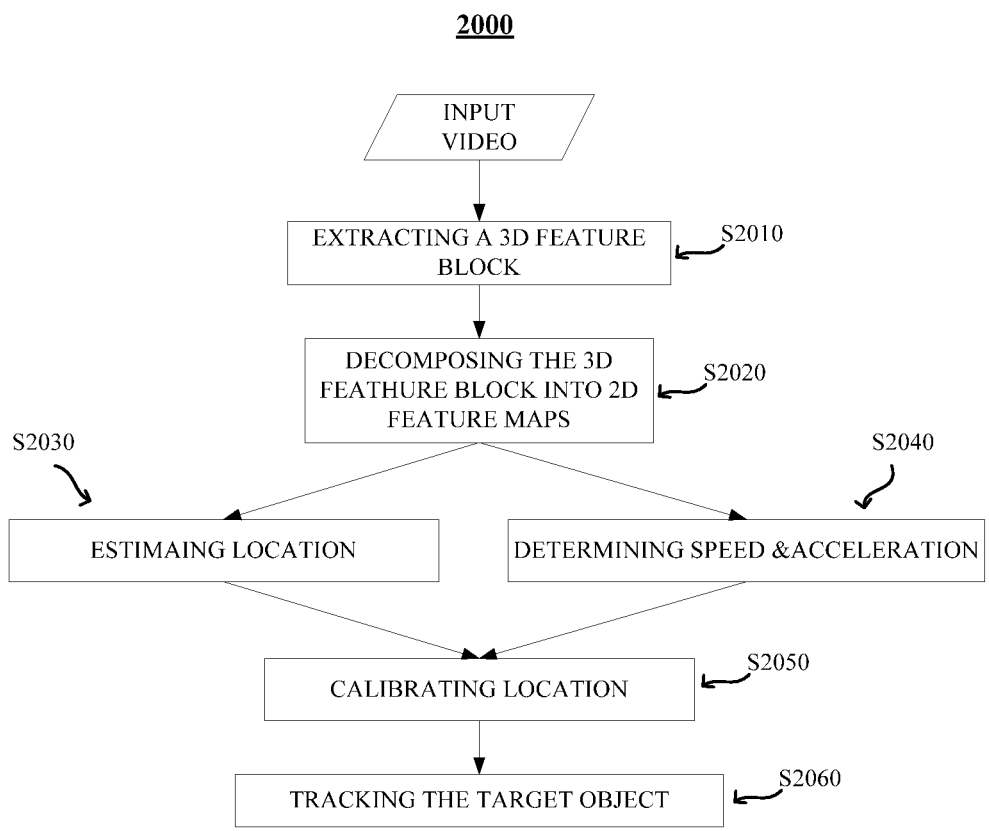
FIG. 2 is a flow chart illustrating a process for tracking a target object in a video according to at least one embodiment of the present application.

FIG. 2 illustrates the above-mentioned process 2000 for tracking a target object in a video. A 3D feature block is extracted from an input video at step S2010. The extracted 3D feature block may be decomposed into a 2D spatial feature map and a 2D spatial-temporal feature map at step S2020. In an alternative implementation, the 2D spatial feature map extends in a first spatial direction and a second spatial direction intersecting with the first spatial direction. In such a case, the 2D spatial-temporal feature map may include a first 2D spatial-temporal feature map extending in the first spatial direction and a temporal direction and a second 2D spatial-temporal feature map extending in the second spatial direction and the temporal direction. At step S2030, a location of a recognized object may be estimated in the 2D spatial feature map. At step S2040, a speed and an acceleration may be determined in the 2D spatial-temporal feature map. With the determined speed and acceleration, the location estimate previously may be calibrated at step S2050. At step S2060, the calibrated location may be used to perform an object tracking task in the video.

As has been described above, a plurality of filtering operations are applied to the video to extract 3D feature blocks, wherein each of the 3D feature blocks represents a particular feature in the video, such as a human head, a leaf, a crowd scene, etc. In practical applications, not all the 3D feature blocks are crucial to recognize the target object. For example, in the case that the target object is a young lady, 3D feature blocks representing irrelevant features (such as roof corners, water waves) may be ignored in subsequent operations to relieve computing burden. On the contrary, the 3D feature blocks representing relevant features (such as hairs, shoes), which is referred to as features of interest (FOIs), may be reserved. This process is called a pruning operation. The key point in the pruning operation resides in how to assess the relevance between the candidate feature and the FOI. In an alternative embodiment, first, the frame is forward to the feature extracting layer to convolute with a first set of filters, which results in a first set of feature maps. Then, the relevance is assessed by investigating the spatial distribution of the first set of feature maps over binary masks containing FOIs of the target object, wherein the binary masks are prepared according to a preset validation set of images as would be appreciated by one skilled in the art.

In the assessment, two benchmarks are adopted, which are referred to as an affinity score and a conspicuous score. The affinity scores measure the overlap degrees between the first set of feature maps and the binary masks. For the i-th binary mask $S_i$ and the n-th feature map in the first set of the feature maps $F_i^n$, the affinity score $\alpha_i^n$ is expressed by rule of:

$$\alpha_i^n = \|1_{[F_i^n > 0]} \cdot S_i\|_1 / \|S_i\|_1 \qquad (1)$$

where $1_{[\cdot]}$ is an indicator function that returns 1 when its input is true, and · denotes an element-wise multiplication operation. The conspicuous scores measure the similarity degrees between the first set of feature maps and the binary masks. For the i-th binary mask $S_i$ and the n-th feature map in the first set of the feature maps $F_i^n$, the conspicuous score $\kappa_i^n$ is expressed by rule of:

$$\kappa_i^n = \|F_i^n \cdot S_i\|_1 / \|F_i^n\|_1 \qquad (2)$$

Then a histogram H is constructed, with respect to the n-th feature map, to assess the relevance between n-th feature map and the FOIs contained in the binary masks. The histogram H is summed over each of the binary mask subscripts $i \in [1, m]$ according to the following logic:

$$Hn(i+1) = Hn(i) + 1_{[\alpha_i^n > \tau_\alpha \cup \kappa_i^n > \tau_\kappa]}, i{+}{+}, i \in [1, m] \qquad (3)$$

The equation (3) expresses that if the affinity score $\alpha_i^n$ is larger than a predetermined threshold $\tau_\alpha$ or the conspicuous score $\kappa_i^n$ is larger than a predetermined threshold $\tau_\kappa$, the histogram H is summed by 1. The histogram Hn will return a certain value after a sum operation over each of the binary mask. The histogram Hn for each feature map in the first set of feature maps (i.e., for each filter in the first set of filters) is calculated in a same manner and be sorted in a descending order. The number of FOIs may be manually set. If the number of FOIs is set to 10, the feature maps with largest 10 Hn are selected from the first set of feature maps to constitute a second set of feature maps. In such a case, 10 3D feature blocks are constructed by combining the selected second set of feature maps over each frame of the video together.

Figure 3:
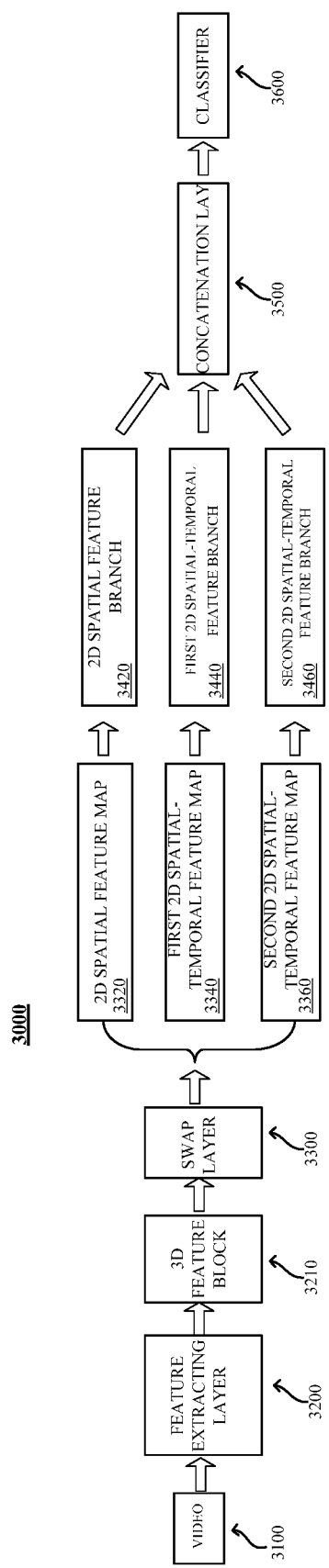
FIG. 3 is a schematic diagram illustrating an exemplary system for providing attribute information of a video according to at least one embodiment of the present application.

FIG. 3 illustrates an exemplary system 3000 for providing attribute information of a video according to another embodiment of the present application. A video 3100 containing a target object may be input into a feature extracting layer 3200. A 3D feature block 3210 including a FOI of the target object may be extracted from the feature extracting layer 3200 and experience a decomposing operation in a swap layer 3300 to be decomposed into a 2D spatial feature map 3320, a first 2D spatial-temporal feature map 3340, and a second 2D spatial-temporal feature map 3360. The 2D spatial feature map 3320 may contain spatial information of the target object, such as a location of the target object in a frame of the video. The first 2D spatial-temporal feature map 3340 and the second 2D spatial-temporal feature map 3360 may contain spatial-temporal information of the target object, such as speed and acceleration of the target object. The 2D spatial feature map 3320, the first 2D spatial-temporal feature map 3340, and the second 2D spatial-temporal feature map 3360 may be forwarded to a 2D spatial feature branch 3420, a first 2D spatial-temporal feature branch 3440, and a second 2D spatial-temporal feature branch 3460, respectively to further enhance semantic representations (discrepancies) thereof. The 2D feature maps with enhanced semantic representations may be combined in a concatenation layer 3500 to construct a 3D feature maps with spatial and temporal information of the target object. A classifier 3600, such as a SVM, may be applied to the constructed 3D feature maps to provide the attribute information (location, speed, acceleration, etc) of the target object.

In an alternative implement, the feature extracting layer 3200 may be pre-trained to give out well-learned a 3D feature block. Then the 2D spatial feature branch 3420, the first 2D spatial-temporal feature branch 3440, and the second 2D spatial-temporal feature branch 3460 may be trained separately based on the well-learned 3D feature block. Then the classifier 3600, such as a SVM, may be trained individually based on the well-trained feature extracting layer 3200, the 2D spatial feature branch 3420, the first 2D spatial-temporal feature branch 3440, and the second 2D spatial-temporal feature branch 3460. This training process enables a high learning efficiency of the whole system 3000.

Figure 4:
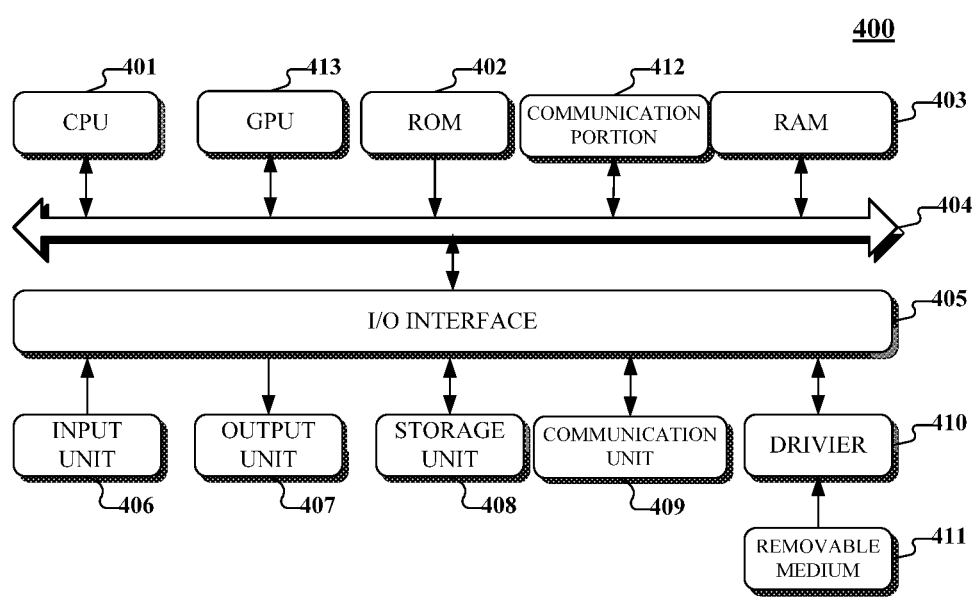
FIG. 4 is a schematic diagram illustrating a system adapted to implement the present application.

FIG. 4 is a schematic diagram illustrating a system adapted to implement the present application.

The system 400 may be a mobile terminal, a personal computer (PC), a tablet computer, a server, etc. In FIG. 4, the system 400 includes one or more processors, a communication portion, etc. The one or more processors may be: one or more central processing units (CPUs) 401 and/or one or more image processor (GPUs) 413, etc. The processor may perform various suitable actions and processes in accordance with executable instructions stored in the read-only memory (ROM) 402 or executable instructions loaded from the storage unit 408 into the random access memory (RAM) 403. The communication portion 412 may include, but is not limited to a network card. The network card may include, but is not limited to an IB (Infiniband) network card. The processor may communicate with the read-only memory 402 and/or the RAM 403 to execute the executable instructions, connect to the communication portion 412 through the bus 404 and communicate with other target devices through the communication portion 412 to complete the corresponding step in the present application. In a specific example of the present application, the steps performed by the processor includes: extracting, from the video, a 3D feature block containing the target object; decomposing the extracted 3D feature block into a 2D spatial feature map containing spatial information of the target object and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location.

In addition, in the RAM 403, various programs and data required by operation of the apparatus may also be stored. The CPU 401, the ROM 402 and the RAM 403 are connected to each other through the bus 404. Where RAM 403 exists, the ROM 402 is an optional module. The RAM 403 stores executable instructions or writes executable instructions to the ROM 402 during operation, and the executable instructions cause the central processing unit 401 to perform the steps included in the image processing method of any of the embodiments of the present application. The input/output (I/O) interface 405 is also connected to the bus 404. The communication portion 412 may be integrated, and may also be provided with a plurality of sub-modules (e.g., a plurality of IB network cards) and connected to the bus 404, respectively.

The following components are connected to the I/O interface 405: an input unit 406 including a keyboard, a mouse, and the like; an output unit 407 including such as a cathode ray tube (CRT), a liquid crystal display (LCD) and a loudspeaker, and the like; a storage unit 408 including a hard disk, and the like; and a communication unit 409 including a network interface card such as a LAN card, a modem, and the like. The communication unit 409 performs communication processing via a network such as the Internet. A driver 410 also connects to the I/O interface 405 as needed. A removable medium 411, such as a magnetic disk, an optical disk, a magneto-optical disk, a semiconductor memory, is installed on the driver 410 as needed so that computer programs read therefrom are installed in the storage unit 408 as needed.

It should be noted that the architecture shown in FIG. 4 is only an alternative implementation. During the specific practice process, the number and types of parts as shown in FIG. 4 may be selected, deleted, added or replaced according to actual needs. Upon setting different functional parts, implementations such as separate setting or integrated setting may also be adopted, for example, the GPU and the CPU may be set separately, and again for the same reason, the GPU may be integrated on the CPU, the communication portion may be set separately, and may also be set integrally on the CPU or GPU. These alternative implementations all fall within the protection scope of the present application.

In particular, according to the embodiments of the present application, the process described above with reference to the flowchart may be implemented as a computer software program, for example, the embodiments of the present application include a computer program product, which includes a computer program tangible included in a machine-readable medium. The computer program includes a program code for performing the steps shown in the flowchart. The program code may include corresponding instructions to perform correspondingly the steps in the image processing method provided by any of the embodiments of the present application, including: extracting, from the video, a 3D feature block containing the target object; decomposing the extracted 3D feature block into a 2D spatial feature map containing spatial information of the target object and a 2D spatial-temporal feature map containing spatial-temporal information of the target object; estimating, in the 2D spatial feature map, a location of the target object; determining, in the 2D spatial-temporal feature map, a speed and an acceleration of the target object; calibrating the estimated location of the target object according to the determined speed and acceleration; and tracking the target object in the video according to the calibrated location.

In such embodiments, the computer program may be downloaded and installed from the network through the communication unit 409, and/or installed from the removable medium 411. When the computer program is executed by the central processing unit (CPU) 401, the above-described instruction described in the present application is executed.

As will be appreciated by one skilled in the art, the present application may be embodied as a system, a method or a computer program product. Accordingly, the present application may take the form of an entirely hardware embodiment and hardware aspects that may all generally be referred to herein as a "unit", "circuit", "module", or "system". Much of the functionality and many of the principles when implemented, are best supported with or integrated circuits (ICs), for example but not limited to, a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present application, further discussion of such software and ICs, if any, will be limited to the essentials with respect to the principles and concepts used by the preferred embodiments. In addition, the present application may take the form of an entirely software embodiment (including firmware, resident software, micro-code, etc.) or an embodiment combining software. For example, the system may include a memory that stores executable components and a processor, electrically coupled to the memory to execute the executable components to perform operations of the system, as discussed in reference to FIGS. 1-3. Furthermore, the present application may take the form of a computer program product embodied in any tangible medium of expression having computer-usable program code embodied in the medium.

What is claimed is:

1. A method for tracking a target object in a video, comprising:
    extracting, from the video, a 3-dimension (3D) feature block containing the target object;
    decomposing the extracted 3D feature block into:
        a 2-dimension (2D) spatial feature map containing spatial information of the target object; and
        a 2D spatial-temporal feature map containing spatial-temporal information of the target object;
    estimating, in the 2D spatial feature map, a location of the target object;
    determining, in the 2D spatial-temporal feature map, a speed and an acceleration of the target object;
    calibrating the estimated location of the target object according to the determined speed and acceleration; and
    tracking the target object in the video according to the calibrated location.

2. The method of claim 1,
    wherein the 2D spatial feature map extends in:
        a first spatial direction; and
        a second spatial direction intersecting with the first spatial direction; and
    wherein the 2D spatial-temporal feature map comprises:
        a first 2D spatial-temporal feature map extending in the first spatial direction and a temporal direction and comprising components of the speed and the acceleration of the target object in the first spatial direction; and
        a second 2D spatial-temporal feature map extending in the second spatial direction and the temporal direction and comprising components of the speed and the acceleration of the target object in the second spatial direction.

3. The method of claim 2, further comprising providing a Convolutional Neural Network (CNN) comprising a feature extracting layer, wherein the extracting comprises:
    filtering, in the feature extracting layer, each frame of the video to obtain first feature maps;
    evaluating overlap degrees and similarity degrees between the first feature maps and a preset image containing a feature of interest (FOI) of the target object; and
    selecting, from the first feature maps, a second feature map according to the overlap degrees and the similarity degrees, wherein the second feature map only contains the FOI of the target object; and
    combining the selected second feature map over each frame of the video together to construct the 3D feature block.

4. The method of claim 3, wherein the CNN further comprises a swap layer coupled to the feature extracting layer, and wherein the decomposing comprises:
    receiving the 3D feature block from the feature extracting layer;
    disabling data of the received feature block in the temporal direction to obtain the 2D spatial feature map; and
    disabling data of the received feature block in one of the first spatial direction and the second spatial direction to obtain the 2D spatial-temporal feature map.

5. The method of claim 4, wherein the CNN further comprises a 2D spatial feature extracting layer coupled to the swap layer, and wherein the estimating comprises:
    receiving the 2D spatial feature map from the swap layer;
    enhancing discrepancies of the FOI in the 2D spatial feature map;
    recognizing the target object according to the enhanced FOI; and
    estimating the location of the recognized target object.

6. The method of claim 5, wherein the CNN further comprises a 2D spatial-temporal feature extracting layer coupled to the swap layer and parallel to the 2D spatial feature extracting layer, and wherein the determining comprises:
    receiving the 2D spatial-temporal feature map from the swap layer;
    enhancing discrepancies of the FOI in the 2D spatial-temporal feature map;
    recognizing the target object according to the enhanced FOI; and
    performing a derivation operation on the recognized target object in the temporal direction, to determine the speed and the acceleration of the target object.

7. The method of claim 6, further comprising:
    training the feature extracting layer independently; and
    training, based on the trained feature extracting layer, the 2D spatial feature extracting layer and the 2D spatial-temporal feature extracting layer separately.

8. A system for tracking a target object in a video, comprising:
    a memory that stores executable components; and
    a processor electrically coupled to the memory to execute the executable components for:
        extracting, from the video, a 3-dimension (3D) feature block containing the target object;
        decomposing the extracted 3D feature block into:
            a 2-dimension (2D) spatial feature map containing spatial information of the target object; and a 2D spatial-temporal feature map containing spatial-temporal information of the target object;
estimating, in the 2D spatial feature map, a location of the target object;
determining, in the 2D spatial-temporal feature map, a speed and an acceleration of the target object;
calibrating the estimated location of the target object according to the determined speed and acceleration; and
tracking the target object in the video according to the calibrated location.

9. The system of claim 8,
wherein the 2D spatial feature map extends in:
a first spatial direction; and
a second spatial direction intersecting with the first spatial direction; and
wherein the 2D spatial-temporal feature map comprises:
a first 2D spatial-temporal feature map extending in the first spatial direction and a temporal direction and comprising components of the speed and the acceleration of the target object in the first spatial direction; and
a second 2D spatial-temporal feature map extending in the second spatial direction and the temporal direction and comprising components of the speed and the acceleration of the target object in the second spatial direction.

10. The system of claim 9, further comprising a Convolutional Neural Network (CNN) including a feature extracting layer, wherein the extracting comprises:
filtering, in the feature extracting layer, each frame of the video to obtain first feature maps;
evaluating overlap degrees and similarity degrees between the first feature maps and a preset image containing a feature of interest (FOI) of the target object; and
selecting, from the first feature maps, a second feature map according to the overlap degrees and the similarity degrees, wherein the second feature map only contains the FOI of the target object; and
combining the selected second feature map over each frame of the video together to construct the 3D feature block.

11. The system of claim 10, wherein the CNN further comprises a swap layer coupled to the feature extracting layer, and wherein the decomposing comprises:
receiving the 3D feature block from the feature extracting layer;
disabling data of the received feature block in the temporal direction to obtain the 2D spatial feature map; and
disabling data of the received feature block in one of the first spatial direction and the second spatial direction to obtain the 2D spatial-temporal feature map.

12. The system of claim 11, wherein the CNN further comprises a 2D spatial feature extracting layer coupled to the swap layer, and wherein the estimating comprises:
receiving the 2D spatial feature map from the swap layer;
enhancing discrepancies of the FOI in the 2D spatial feature map;
recognizing the target object according to the enhanced FOI; and
estimating the location of the recognized target object.

13. The system of claim 12, wherein the CNN further comprises a 2D spatial-temporal feature extracting layer coupled to the swap layer and parallel to the 2D spatial feature extracting layer, and wherein the determining comprises:

receiving the 2D spatial-temporal feature map from the swap layer;
enhancing discrepancies of the FOI in the 2D spatial-temporal feature map;
recognizing the target object according to the enhanced FOI; and
performing a derivation operation on the recognized target object in the temporal direction, to determine the speed and the acceleration of the target object.

14. The system of claim 13, wherein the feature extracting layer is trained independently; and the 2D spatial feature extracting layer and the 2D spatial-temporal feature extracting layer are separately trained based on the trained feature extracting layer.

15. A non-transitory computer readable storage medium for storing computer readable instructions executable by a processor to perform operations, the operations comprising:
extracting, from a video, a 3-dimension (3D) feature block containing a target object;
decomposing the extracted 3D feature block into:
a 2-dimension (2D) spatial feature map containing spatial information of the target object; and
a 2D spatial-temporal feature map containing spatial-temporal information of the target object;
estimating, in the 2D spatial feature map, a location of the target object;
determining, in the 2D spatial-temporal feature map, a speed and an acceleration of the target object;
calibrating the estimated location of the target object according to the determined speed and acceleration; and
tracking the target object in the video according to the calibrated location.

16. The non-transitory computer readable storage medium of claim 15,
wherein the 2D spatial feature map extends in:
a first spatial direction; and
a second spatial direction intersecting with the first spatial direction; and
wherein the 2D spatial-temporal feature map comprises:
a first 2D spatial-temporal feature map extending in the first spatial direction and a temporal direction and comprising components of the speed and the acceleration of the target object in the first spatial direction; and
a second 2D spatial-temporal feature map extending in the second spatial direction and the temporal direction and comprising components of the speed and the acceleration of the target object in the second spatial direction.

17. The non-transitory computer readable storage medium of claim 16, wherein the operations further comprises providing a Convolutional Neural Network (CNN) comprising a feature extracting layer, wherein the extracting comprises:
filtering, in the feature extracting layer, each frame of the video to obtain first feature maps;
evaluating overlap degrees and similarity degrees between the first feature maps and a preset image containing a feature of interest (FOI) of the target object; and
selecting, from the first feature maps, a second feature map according to the overlap degrees and the similarity degrees, wherein the second feature map only contains the FOI of the target object; and
combining the selected second feature map over each frame of the video together to construct the 3D feature block.

18. The non-transitory computer readable storage medium of claim 17, wherein the CNN further comprises a swap layer coupled to the feature extracting layer, and wherein the decomposing comprises:
   receiving the 3D feature block from the feature extracting layer;
   disabling data of the received feature block in the temporal direction to obtain the 2D spatial feature map; and
   disabling data of the received feature block in one of the first spatial direction and the second spatial direction to obtain the 2D spatial-temporal feature map.

19. The non-transitory computer readable storage medium of claim 18, wherein the CNN further comprises a 2D spatial feature extracting layer coupled to the swap layer, and wherein the estimating comprises:
   receiving the 2D spatial feature map from the swap layer;
   enhancing discrepancies of the FOI in the 2D spatial feature map;
   recognizing the target object according to the enhanced FOI; and
   estimating the location of the recognized target object.

20. The non-transitory computer readable storage medium of claim 19, wherein the CNN further comprises a 2D spatial-temporal feature extracting layer coupled to the swap layer and parallel to the 2D spatial feature extracting layer, and wherein the determining comprises:
   receiving the 2D spatial-temporal feature map from the swap layer;
   enhancing discrepancies of the FOI in the 2D spatial-temporal feature map;
   recognizing the target object according to the enhanced FOI; and
   performing a derivation operation on the recognized target object in the temporal direction, to determine the speed and the acceleration of the target object.

* * * * *